US009798652B2

(12) United States Patent
Kapinski et al.

(10) Patent No.: US 9,798,652 B2

(45) Date of Patent: Oct. 24, 2017

(54) COVERAGE GUIDED TECHNIQUE FOR BUG FINDING IN CONTROL SYSTEMS AND SOFTWARE

(71) Applicants: Toyota Motor Engineering & Manufacturing North America, Inc., Erlanger, KY (US); University Joseph Fourier, Saint-Martin-d'Hères, Grenoble (FR)

(72) Inventors: James P. Kapinski, Redondo Beach, CA (US); Jyotirmoy V. Deshmukh, Torrance, CA (US); Xiaoqing Jin, Torrance, CA (US); Thao Dang, Gieres (FR); Tommaso Dreossi, Gieres (FR)

(73) Assignees: TOYOTA MOTOR ENGINEERING & MANUFACTURING NORTH AMERICA, INC., Erlanger, KY (US); UNIVERSITY JOSEPH FOURIER, Saint-Martin-D'Hères, Grenoble (FR)

( * ) Notice: Subject to any disclaimer, the term of this patent is extended or adjusted under 35 U.S.C. 154(b) by 127 days.

(21) Appl. No.: 14/847,221

(22) Filed: Sep. 8, 2015

(65) Prior Publication Data

US 2016/0092346 A1 Mar. 31, 2016

Related U.S. Application Data

(60) Provisional application No. 62/056,383, filed on Sep. 26, 2014.

(51) Int. Cl.

*G06F 11/00* (2006.01)

*G06F 11/36* (2006.01)

(52) U.S. Cl.

CPC ...... *G06F 11/3676* (2013.01); *G06F 11/3648* (2013.01)

(58) Field of Classification Search

CPC ............... G06F 11/3608; G06F 11/362; G06F 11/3676; G06F 11/3648; G06F 11/261;

(Continued)

(56) References Cited

U.S. PATENT DOCUMENTS 6,408,262 B1 * 6/2002 Leerberg ............. G06F 11/3608 703/2

7,055,065 B2 * 5/2006 Farchi ................. G06F 11/3676 714/37

(Continued)

OTHER PUBLICATIONS

Shyam, Smitha et al., GUIDO: Hybrid Verification by Distance-Guided Simulation, 2006, Advanced Computer Architecure Lab, pp. 1-8.*

(Continued)

*Primary Examiner* — Marc Duncan

(74) *Attorney, Agent, or Firm* — Snell & Wilmer L.L.P.

(57) ABSTRACT

A computer-implemented method for automatically identifying a faulty behavior of a control system. The method includes receiving, at a test processor, a description of the faulty behavior. The method also includes selecting, using the test processor, a goal state based on a heuristic decision. The method also includes selecting, using the test processor, a selected system state. The method also includes selecting, using the test processor, a selected variable to the control system based on the goal state. The method also includes loading, from a memory, a control model of the control system. The method also includes performing, using the test processor, a simulation of the control model using the selected variable and the selected system state as parameters of the simulation. The method also includes determining, using the test processor, whether the faulty behavior was observed based on the simulation.

22 Claims, 6 Drawing Sheets

300

SELECT GOAL 301

SELECT STATE 302

SELECT VARIABLES 304

SIMULATION STEP 306

308 BUG FOUND? YES → HALT (BUG FOUND) 310

NO

312 ITERATION LIMIT REACHED? YES → HALT (NO BUG FOUND) 314; NO → SELECT GOAL

(58) Field of Classification Search
CPC ............ G06F 17/5009; G05B 23/0218; G05B 23/0243
See application file for complete search history.

(56) References Cited

U.S. PATENT DOCUMENTS

| | | | | |
|---|---|---|---|---|
| 7,130,783 | B1 * | 10/2006 | Harer | G06F 11/261 703/13 |
| 7,447,593 | B2 | 11/2008 | Estkowski et al. | |
| 8,185,265 | B2 | 5/2012 | Nagano | |
| 8,706,452 | B2 | 4/2014 | Miller | |
| 8,868,977 | B2 * | 10/2014 | Birnbaum | G06F 11/3608 703/21 |
| 2005/0160321 | A1 * | 7/2005 | Cleaveland | G06F 11/3684 714/38.1 |
| 2008/0126063 | A1 * | 5/2008 | Beer | G06F 17/5022 703/14 |
| 2012/0024605 | A1 | 2/2012 | Elinas et al. | |
| 2014/0330758 | A1 * | 11/2014 | Yu | G06N 5/02 706/12 |
| 2016/0092628 | A1 * | 3/2016 | Giguere | G06F 17/5095 703/8 |

OTHER PUBLICATIONS

Tarik Nahhal and Thao Dang; Coverage-Guided Test Generation Tool for Hybrid Systems; 2007; pp. 3.

Jongwoo Kim and Joel M. Esposito; Adaptive Sample Bias for Rapidly-Exploring Random Trees with Applications to Test Generation; Jun. 2005; pp. 8.

Erion Plaku et al.; Sampling-Based Roadmap of Trees for Parallel Motion Planning; Aug. 2005; pp. 12.

Nicolas R.J. Lawrence and Salah Sukkarieh; Wind Energy Based Path Planning for a Small Gliding Unmanned Aerial Vehicle; Aug. 2009; pp. 18.

Liangjun Zhang and Dinesh Manocha; An Efficient Retraction-based RRT Planner; May 2008; pp. 8.

Pawel Skruch; Application of Model-Based Approach for Testing Dynamic Systems; 2011; pp. 12.

Andrew B. Walker; Hard Real-Time Motion Planning for Autonomous Vehicles; Nov. 2011; pp. 120.

S.S. Manimaran and Balarman Ravindran; Policy Iteration on Continuous Domains Using Rapidly-exploring Random Trees; Jun. 2014; pp. 3.

Marc Toussaint and Christian Goerick; Probabilistic Interference for Structured Planning in Robotics; Nov. 2007; pp. 6.

Aditya Zutshi et al., A Trajectory Splicing Approach to Concretizing Counterexamples for Hybrid Systems; Dec. 2013; pp. 9.

Vojtěch Vonásek et al.; A Sampling Scheme for Rapidly Exploring Random Trees Using a Guided Path; Sep. 2011; pp. 6.

Tommaso Dreossi et al; Efficient Guiding Strategies for Testing of Temporal Properties of Hybrid Systems; 2015; pp. 16.

Tarik Nahhal and Thao Dang; Test Coverage for Continuous and Hybrid Systems; 2007; 14 pages.

Thao Dang and Tarik Nahhal; Coverage-Guided Test Generation for Continuous and Hybrid Systems; Feb. 7, 2009 pp. 31.

* cited by examiner

COVERAGE GUIDED TECHNIQUE FOR BUG FINDING IN CONTROL SYSTEMS AND SOFTWARE

CROSS-REFERENCE TO RELATED APPLICATIONS

This application claims the benefit and priority of U.S. Provisional Application No. 62/056,383, entitled "Coverage and Robustness Guided Technique for Bug Finding in Control Systems and Software," filed on Sep. 26, 2014, the entire contents of which is hereby incorporated by reference herein.

BACKGROUND

Field

The present disclosure relates to bug finding and, more specifically, to a test system for finding bugs in automotive control systems and software.

Description of the Related Art

Control systems exist in nearly all forms of technology and perform functions such as controlling a combustion engine, controlling applications on smartphones and the like. Control systems can include software control systems, hardware control systems and control systems having hardware and software elements. "Bugs" or causes of faulty behavior of these control systems are undesirable in any field of technology. "Bugs" are so common in control system development that verification processes are now integral to product development prior to product release. The faulty behavior can cause frustration during diagnosis and, if not caught during verification processes, they may become exposed to consumers who may devalue the product based on the faulty behavior.

Automated techniques for verification of hardware and software (i.e., searching for "bugs") have existed for some time. These automated techniques include simulation of the run-time environments, hardware in the loop testing and calibration. Inefficient automated testing techniques can significantly increase the cost of the design process and/or may catch fewer bugs than efficient automated testing techniques. Thus, it is desirable to use an optimized automated testing technique when verifying the operation of any hardware or software design.

Traditionally, automated testing was used for verification of proper operation of hardware devices. However, traditional automated testing is not optimal for testing the design of real-time control systems (such as control systems for automotive applications).

Thus, there is a need for efficient automated testing systems and methods for verifying proper operation of real-time control systems.

SUMMARY

Described herein are systems and methods for efficiently testing operation of real-time control systems. An exemplary computer-implemented method includes receiving, at a test processor, a description of the faulty behavior. The method also includes selecting, using the test processor, a goal state based on a heuristic decision. The method also includes selecting, using the test processor, a selected system state. The method also includes selecting, using the test processor, a selected variable to the control system based on the goal state. The method also includes loading, from a memory, a control model of the control system. The method also includes performing, using the test processor, a simulation of the control model using the selected variable and the selected system state as parameters of the simulation. The method also includes determining, using the test processor, whether the faulty behavior was observed based on the simulation.

Another exemplary computer-implemented method for automatically identifying a faulty behavior of a control system within a state space includes receiving, at a test processor, a description of the faulty behavior. The method also includes dividing, using the test processor, the state space into at least two regions. The method also includes selecting, using the test processor, a goal state within one of the at least two regions. The method also includes selecting, using the test processor, a selected system state based on a Euclidean distance. The method also includes selecting, using the test processor, a selected variable to the control system based on the goal state. The method also includes loading, from a memory, a control model of the control system. The method also includes performing, using the test processor, a simulation of the control model using the selected variable as a parameter of the simulation. The method also includes determining, using the test processor, whether the faulty behavior was observed based on the simulation.

An exemplary test system for automatically identifying a faulty behavior of a controller includes a memory configured to store a model of the controller and a test processor. The test processor is configured to receive a description of the faulty behavior. The test processor is also configured to select a goal state based on a coverage value. The test processor is also configured to select a selected system state and select a variable to the controller based on the goal state. The test processor is also configured to perform a simulation of the controller using the model of the controller and the variable as a parameter of the model of the controller. The test processor is also configured to determine whether the faulty behavior was observed based on the simulation.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Disclosed herein are systems and methods for providing efficient automated testing of real-time control systems. The systems and methods provide several benefits and advantages over legacy testing systems. For example, the systems and methods can be used to automatically select desirable locations of a test field to test by selecting a goal point during each iteration of the testing. By doing so, the next state can better reflect test purposes, compared to the classical approaches that determine a next state totally randomly. The systems and methods also provide the benefits and advantages of evenly testing regions of the available test field. In that regard, a user can ensure that each region of the test field is tested, which is preferable as compared to legacy test systems that can have all testing performed in a single region of the test field. The systems and methods provide additional benefits and advantages such as the ability to test states within the state space that are not predefined by a user, resulting in a testing procedure that explores the system states more thoroughly.

An exemplary test system includes an input device for receiving input to the system and an output device for outputting data from the system. The test system may also include an input/output port for connecting the system to a hardware controller to be tested. The test system can also include a memory for storing data including a control system modeling program, test code to perform the test simulations and results of the test simulations. The test system can also include a test processor coupled to the input device, the output device, the input/output port and the memory. The test processor can simulate the control system and an environment of the control system by running the modeling program and can test the control system within the simulated environment by miming the test code.

While this disclosure is directed to use of systems and methods for control system testing, and more specifically, for testing of automotive control systems, one skilled in the art will realize that the use of the systems and methods herein can be used to test various additional hardware and software control systems.

Figure 1:
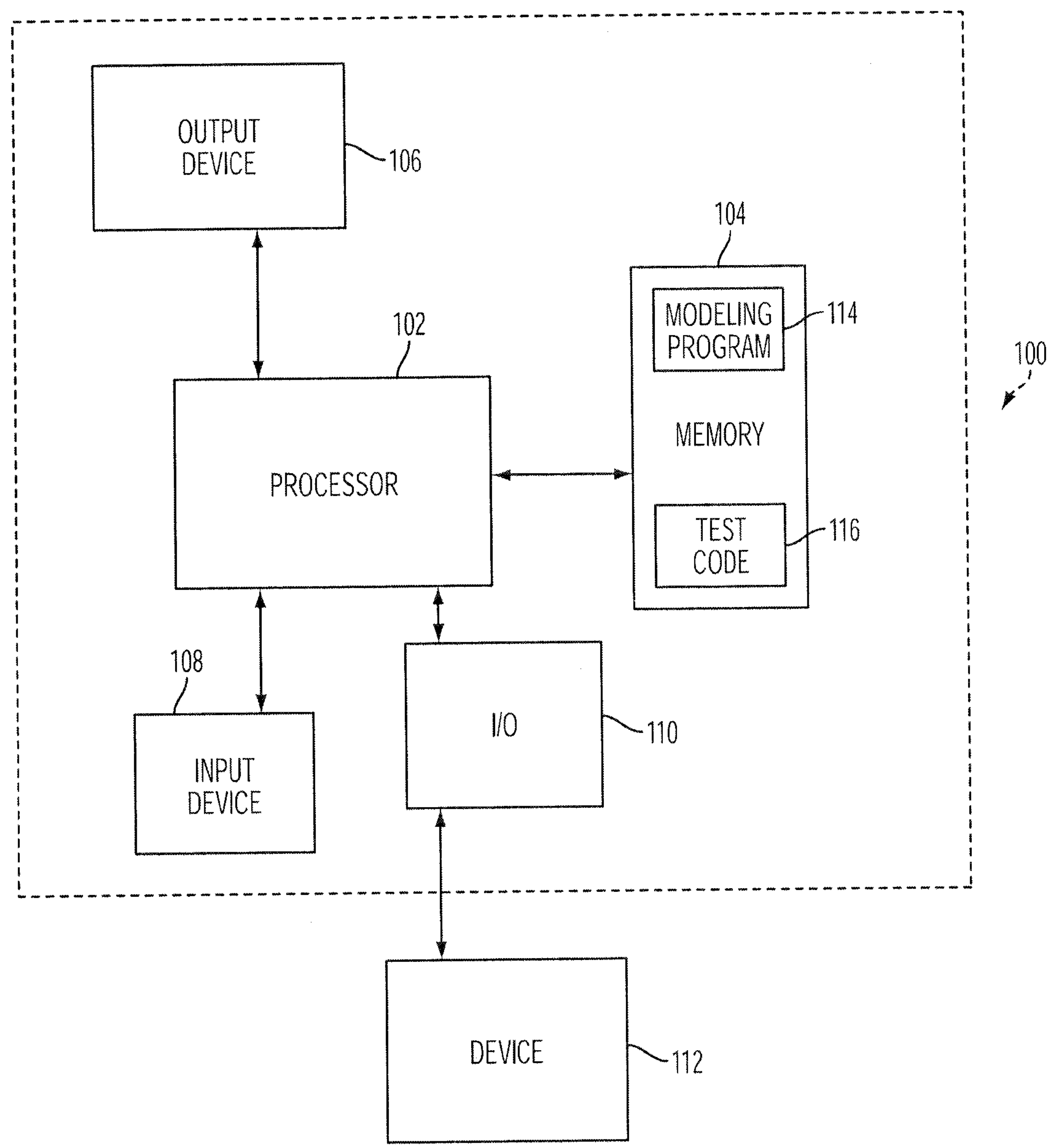
FIG. 1 illustrates a test system for determining faulty behavior within a control system according to an embodiment of the present invention.

Turning to FIG. 1, a test system 100 for determining faulty behavior within a control system includes a test processor 102, a memory 104, an output device 106, an input device 108 and an input/output (I/O) port 110. The test system 100 may include more or less components than illustrated in FIG. 1.

The test processor 102 may include a test processor capable of performing simulation of complex control systems, such as an ARM processor, DSP processor, distributed processor, ASIC processor, programmed FPGA or other form of processing. The test processor 102 may be adapted to run machine-readable instructions. In particular, the test processor 102 may be adapted to perform instructions (such as a test code 116 stored in the memory 104) for verification of a control system. The test processor 102 may also be adapted to perform instructions (such as a modeling program 114 stored in the memory 104) for modeling the operation of a control system. When referenced herein, a control system may refer to a controller, an environment of the controller or a combination of both.

The test processor 102 is typically coupled to the memory 104. The memory 104 can include a non-transitory memory or a data storage device, such as a hard disk drive, a solid-state disk drive, a hybrid disk drive, or other appropriate data storage. The memory 104 may further store machine-readable instructions, such as test code 116 and/or modeling program 114, which may be loaded and executed by the test processor 102. In some embodiments, the test processor 102 can be designed to perform specific functions, such as performing iterations of the test code 116. In that regard, the test code 116 may be designed into the hardware or firmware of the test processor 102.

The test processor 102 may also be coupled to the output device 106. The output device 106 can include any device capable of outputting data. For example, the output device 106 may include a display such as one or more LEDs, a computer monitor, a touch screen, or the like; the output device 106 can include a speaker capable of outputting audio data; or the output device 106 can include any other output device or combination of two or more output devices. The output device 106 may be integral to the test system 100, may be external to the test system 100 or both.

The test processor 102 may also be directly or indirectly connected to the input device 108. The input device 108 may be any device capable of providing input to the test processor 102. For example, the input device 108 may include one or more of a mouse, a keyboard, a touchscreen, or the like. The input device 108 may be integral to the test system 100, may be external to the test system 100 or both.

The test processor 102 may also be connected to the I/O port 110. The I/O port 110 may be any port capable of allowing data to transfer to and from the test processor 102. For example, the I/O port 110 may include one or more of a data port, a Bluetooth or Wi-Fi antenna, a mobile telecommunication antenna, or the like. In some embodiments, a remote device can communicate with the test system 100 via the I/O port 110.

The test system 100 is adapted to test a control system. In some embodiments, the test system 100 may be adapted to connect to a device 112 to be tested, such as a hardware controller or a device containing a hardware or software controller. In these embodiments, the device 112 may be connected to the I/O port 110. The test processor 102 may then perform functions based on machine-readable instructions (such as the test code 116) that verify the operations of the device 112. The test processor 102 may also perform functions based on machine-readable instructions (such as the modeling program 114) to simulate the working environment of the device 112 (i.e., by modeling the environment using the modeling program 114).

In some embodiments, a model of the device 112 may be tested by the test system 100 instead of or in addition to testing the device 112. A model of the device 112 (such as a software representation of a hardware or software controller) may be created using the modeling program 114 and the model may be loaded into the memory 104 and/or the test processor 102. In these embodiments, the test processor 102 can perform functions based on machine-readable instructions, such as the test code 116, in order to verify the operation of the controller via the model.

Verification of a control system using models of the control system and the environment of the control system provides advantages over connecting the test system 100 to the device 112. Testing of a model requires creation of a model of the control system and the environment. However, these models are often designed prior to manufacture of the control system or environment and are typically less expensive to produce than the corresponding hardware. Thus, use of a model allows for testing in earlier stages of design as well as providing a reduced testing cost. Testing a model instead of a hardware device also eliminates the wasteful testing of a hardware controller that may have a manufacturing defect.

In an exemplary embodiment, the controller to be tested may be an air-to-fuel ratio controller. In order to use the test system 100 to test the air-to-fuel ratio controller, the air-to-fuel ratio controller may be connected to the I/O port 110. The test processor 102 may then perform operations that generate inputs to the air-to-fuel ratio controller, receive output from the air-to-fuel ratio controller and verify the output of the air-to-fuel ratio controller. In some embodiments, a model of the air-to-fuel ratio controller, such as one created using the modeling program 114, may be loaded into the test system 100. The test processor 102 may then run the test code 116 to generate inputs to the model, receive outputs from the model and verify the output of the model (and thus the operation of the controller) using the test code 116.

The test system 100 may be adapted to test closed loop systems. A closed loop system refers to a system or model including the controller to be tested and the environment of the controller. By using a closed loop testing system, accurate verification of the controller can be achieved as the test system 100 can test very specific sets of operating conditions of the environment, simulating how the controller will operate in real life under real operating conditions. Continuing the example of the air-to-fuel ratio controller, the closed loop system may include a model of the controller as well as a model of the vehicle. The model of the vehicle may include data such as temperature and humidity conditions and system parameters such as heat transfer coefficients and values for controller gains.

Figure 2:
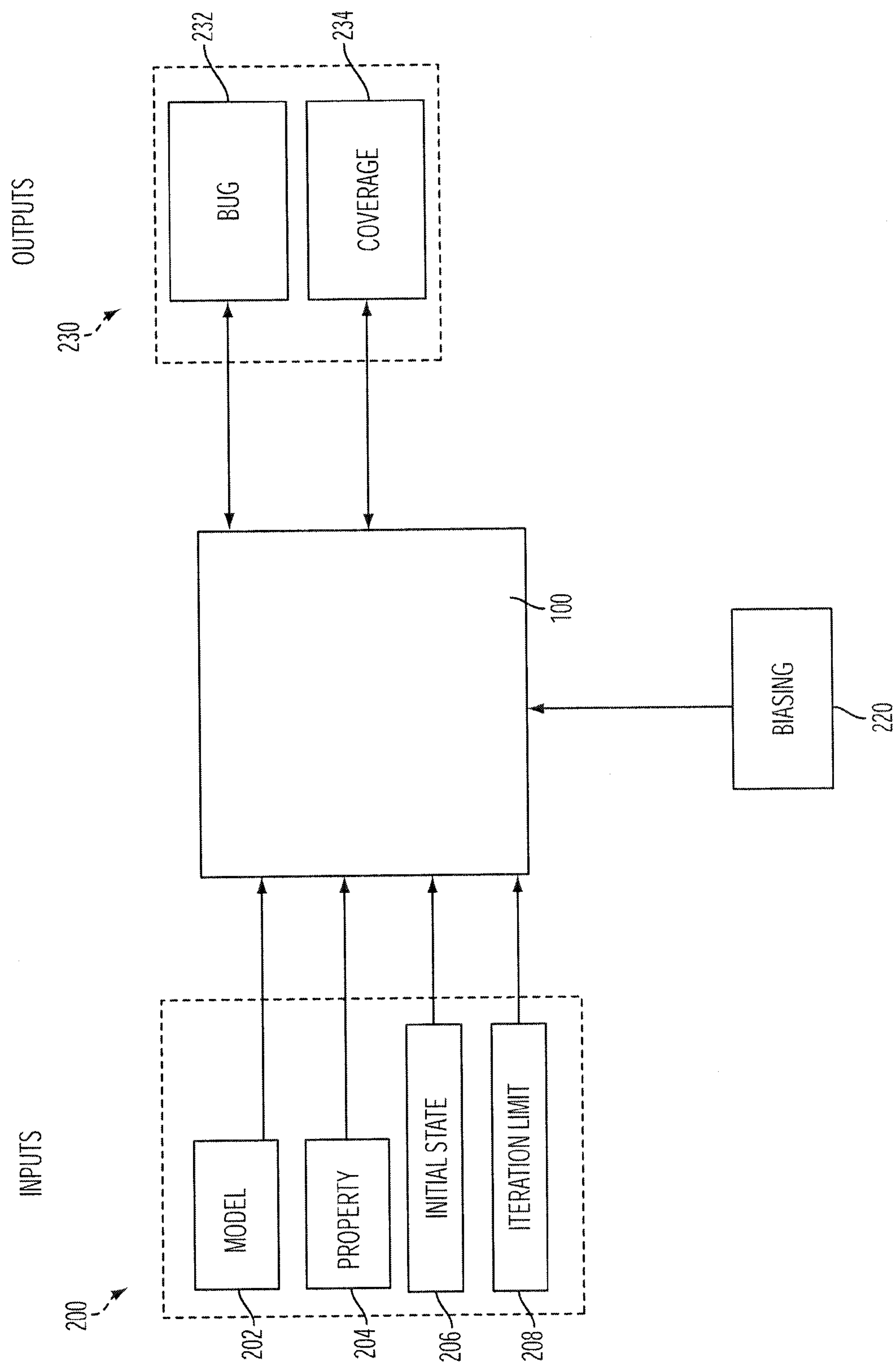
FIG. 2 illustrates a logic diagram including inputs and outputs of a test system for determining faulty behavior within a control system according to an embodiment of the present invention.

With reference now to FIG. 2, a logic diagram of the test system 100 indicates that the test system 100 receives inputs 200 and generates outputs 230. Biasing data 220, which will be explained in more detail below, may be an input or may be known by the test system 100.

The inputs 200 to the test system 100 include a model 202 (which also or instead may be created using the test system 100), at least one property 204, an initial state 206 of the controller and/or the environment and an iteration limit 208.

The model 202 includes a model of the controller to be tested and/or a model of the environment. As mentioned above, the model 202 may be provided using the modeling program 114 of FIG. 1 and may include, for example, Simulink™ or MatLab™, each available from MathWorks of Natick, Mass.

The property 204 is a property that defines acceptable and/or unacceptable bounds of operation of the control system. In other words, the property 204 defines faulty behavior, or a "bug," of the control system. The property 204 may be defined as a portion of the state space in which a state of the control system should not reach during proper operating conditions, or may be defined as a portion of the state space in which a state of the control system should always operate during proper operating conditions.

Returning to the example of the air-to-fuel ratio controller, a given property may include that the air-to-fuel ratio should remain within ten percent (10%) of some operating condition, such as a 14.7% air-to-fuel ratio. The property will be satisfied as long as the air-to-fuel ratio is between 13.23% and 16.17%. The property above may also be defined as that the air-to-fuel ratio should not be between 0% and 13.22% or that it should not be above 16.18%.

A state can be defined as the values of the quantities that evolve due to the mathematical model of the system, the given parameters of the system and the inputs of the system. In other words, the state is all of the information that, together with the model, the parameters, and the inputs, determines the future behaviors of the system. The initial state 206 may be a set of operating conditions that are defined as reasonable operating conditions of the environment. Continuing the example of the air-to-fuel ratio controller, a state may include an engine speed, throttle plate rotational position, air pressure inside the intake manifold, etc. An exemplary initial state 206 may include an engine speed of 2,500 rpm, a throttle plate rotational position of 45 degrees, an air pressure inside the intake manifold of 50 kilopascal (kPa), etc., as these are reasonable operating conditions of a vehicle.

The iteration limit 208 is the number of iterations of testing that is desired. The test code 116 will run a number of tests of the controller that is equal to the iteration limit. The iteration limit may be fixed preset number and/or the test system 100 or a user may dynamically change the iteration limit during testing.

The outputs 230 include bug data 232 and coverage 234. The outputs 230 may also be redirected to or recycled within the test system 100 to be used as inputs.

The bug data 232 may include whether a bug was detected or not. A bug is detected when the output of the controller does not fall within a desired property (or falls within an undesired property). The bug data 232 may also include the state of the environment that caused the bug to occur. Returning to the example of the air-to-fuel ratio controller in which a desired property is that the air-to-fuel ratio should remain between 13.23% and 16.17%; suppose the air-to-fuel ratio reaches 17.0% during testing at an engine speed of 4,500 rpm, a throttle plate rotational position of 90 degrees and an air pressure inside the intake manifold of 100 kPa. In this scenario, the test system 100 output of the bug data 232 can include an indication that a bug occurred as a result of the air-to-fuel ratio being over 16.17% or reaching 17.0%. The test system 100 may also provide the state that caused the bug, which is the engine speed of 4,500 rpm, the throttle plate rotational position of 90 degrees and the air pressure inside the intake manifold of 100 kPa, and may also include the previous state or states.

A test field may include an area including all possible or realistic environmental factors. Returning to the air-to-fuel ratio controller example, the test field may include all engine speeds from 0 rpm to 6,000 rpm, all throttle plate rotational positions between 0 degrees and 90 degrees and all air pressures inside the intake manifold between 20 kPa and 110 kPa. The test field may be divided into regions. In a simple example, a first region may include engine speeds from 0 rpm to 3,000 rpm, throttle plate rotational positions between 0 degrees and 45 degrees and air pressures inside the intake manifold between 20 kPa and 65 kPa. A second region may include engine speeds from 3,000 rpm to 6,000 rpm, throttle plate rotational positions between 45 degrees and 90 degrees and air pressures inside the intake manifold between 65 kPa and 110 kPa.

Coverage 234 refers to a measurement of how evenly the test field has been tested. For example, coverage may indicate how many test results fell within each region of the test field. Many test fields can include an infinite set of points within the test field. A maximum coverage value refers to the fact that each region of the test field has been tested an equal number of finite times. Continuing the example of the air-to-fuel ratio controller having the two regions defined above, coverage values for a situation in which seven iterations of the test were performed within the first region and three iterations of the test were performed within the second region would indicate that 70% of the iterations were in the first region and 30% of the iterations were in the second region.

Coverage 234 may also be based on the volume of each region. For example, region 1 may include a grid that is one unit by one unit and region 2 may include a grid that is one unit by two units. In a situation where each region may include one test point, coverage 234 may indicate that region 2 is not as well covered as region 1 because region 2 has the same number of test points as region 1 yet has a larger volume.

Coverage 234 is also utilized as an input to the test system 100. The test system 100 uses coverage 234 as a factor for determining a next goal state such that the next goal state may be within a less-covered region of the test field. Continuing the example above, and if the system were to determine test points using coverage only, the next iteration of the test would likely be performed within the second region in order to provide better or greater coverage of the test field.

In some embodiments, the goal state may also be selected based on other factors, such as pure randomness, a distance of the goal from the bounds of the state space (for example, selection of goals relatively near the outer bounds of the state space), or the like. In this regard, biasing 220 is an indicator of how much weight is given to each factor. Biasing 220 will be discussed in further detail below with reference to FIG. 4.

Figure 3:
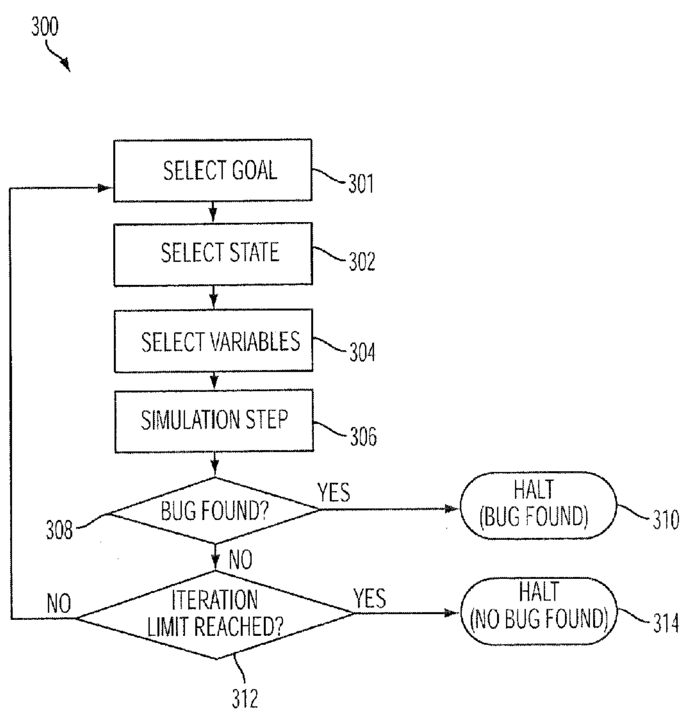
FIG. 3 is a flow chart illustrating a method for finding a bug in a control system according to an embodiment of the present invention.

With reference to FIGS. 1 and 3, a flow chart illustrating a method 300 for finding a bug in a control system is shown. The method 300 or a similar method may be performed by the test system 100 or a test system similar to the test system 100. Steps of the method 300 may be performed by the test processor 102 using machine-readable instructions stored in the memory 104, such as the test code 116 and/or the modeling program 114. Utilizing the inputs 200, the method 300 attempts to select a set of variables that will lead to an incorrect behavior (indicating a bug) of the control system. It is a goal of the method 300 to cause the control system to reach a state that lies within an undesired property, indicating a bug.

In block 301, a goal is selected by the test processor 102. The goal or goal state is a test state that the method 300 will attempt to achieve during a present iteration of the simulation of the model. After a goal state is selected, the test processor 102 can select variables that may lead to that goal state. In the simplest example, a goal state may be selected in a failure test region (a region indicating an undesirable property of the control system). By selecting a goal in the failure test region, an input can be selected such that when the first iteration of the simulation is performed, the output will be in the failure test region. However, it is assumed that it is undesirably difficult to pick variables that immediately lead to failure of the control system when the control system is relatively complicated. Therefore, a goal is typically selected somewhere within the acceptable test field.

The goal may be selected using a stochastic procedure. The stochastic procedure may be totally random, may include heuristic decisions or may be a combination of randomness and heuristic decisions. The heuristic decisions may include, for example, coverage of the system state space.

Coverage is a quantity that indicates the degree to which the set of all possible system states are populated with states computed by the method 300. To compute this quantity, the set of all possible system states are divided into a collection of regions. Each of the regions is associated with a numeric value that indicates the degree to which the region is covered by system states that result from the simulation.

In preferred embodiments, a goal may be selected randomly on the first iteration of the method 300. In subsequent iterations, the goal selection may be selected based on coverage values.

In block 302, the test processor 102 selects a state based on a technique, such as a purely random choice or based on a Euclidean distance. In a preferred embodiment, the state is selected using a Euclidean distance. Using a Euclidean distance, a state is selected that is nearest in distance to the goal. By selecting a state that is closest or nearest to the goal, the test processor 102 can select variables that result in a test point closest to the goal. For example, an initial state may be provided as one of the inputs 200. The test processor 102 and/or the memory 104 may keep a state list that includes the initial state. During the initial iteration of the method 300, the initial state will be selected, as it is the only state within the state list. After each subsequent iteration of the method 300, a new state will be tested and added to the state list, increasing the potential states from which a current state may be selected.

In block 304, variables are selected by the test processor 102. The variables are variable inputs to the control system and/or the environment. In the air-to-fuel ratio controller example, a variable may be an amount of depression on a gas pedal. The variables may be selected using a stochastic procedure. The procedure may be random or it may be based on a heuristic technique for selecting the most appropriate input to achieve the desired goal of identifying incorrect system behaviors. The heuristic technique may include selecting variables based on an algorithm that causes the resulting state of the simulation to be a state near the goal state (when the simulation is performed using the variables and the selected state). When selecting the variables, an approximation of the resulting state of the simulation will be known. Therefore, the test processor 102 can use the approximation of the resulting state to select inputs that increase the likelihood of the resulting state being near the goal state.

Continuing the air-to-fuel ratio example, the goal may be a state in which the engine speed is 4,000 rpm, the throttle plate rotational position is 45 degrees, and the air pressure inside the intake manifold is 50 kPa. An initial state may include an engine speed of 0 rpm, a throttle plate rotational position of 45 degrees, and an air pressure inside the intake manifold of 40 kPa. Simulating the model of the control system using the initial state and the inputs may result in a new state that is near the goal state. In order for the state resulting from the simulation to approach the selected goal, the variable would likely be equal to a significant depression of the gas pedal, such that it will cause the speed of the engine to increase.

In block 306, the simulation is performed by a test processor, such as the test processor 102 of FIG. 1. During the simulation, the test processor may initiate the model of the control system and the environment. The simulation will then run, simulating the characteristics of the control system and the environment using the state selected in block 302 and the variables selected in block 304 as operating parameters. As a result of the simulation in block 306, a new state is achieved. The new state may be represented by a set of numerical values. Continuing the above example of the air-to-fuel ratio controller, the new state may be 3,500 rpm, the throttle plate rotational position may be 45 degrees, and the air pressure inside the intake manifold may be 40 kPa. This new state is approaching the goal state from the initial state. This new state will also be added to the state list.

After the simulation is performed, the coverage values are updated by the test processor and stored in a memory similar to the memory 104 of FIG. 1. The new updated coverage values are based on previous coverage values as well as the new state and the property.

After the simulation is performed in block 306, the test processor determines whether a bug is found in block 308. To make this determination, the new state that is a result of block 306 is compared to the property that was provided as an input to the method 300. If the resulting state is within the acceptable property set then a bug has not been found. However, if the resulting state is within an undesired property set then a bug has been found. In block 310, if a bug is found, the method will stop and output data associated with the bug. The method 300 may then also output coverage data.

If a bug has not been found in block 308, then the test processor determines whether the iteration limit has been reached in block 312. The iteration limit is the number of iterations of testing that will be performed on the control system. The iteration limit was provided as an input to the method 300. The test processor also stores an iteration count which is compared to the iteration limit. During each iteration of the method 300, the iteration count is incremented by one. When the iteration count equals the iteration limit, then the iteration limit has been reached. If the iteration limit has not been reached, the method 300 returns to block 301 where a new goal is selected. If an iteration limit has been reached then the process ends in block 314 and the result of the method 300 is that no bug has been found. The method 300 may then provide coverage data as the output.

After the first iteration of the process, the memory may contain a list of states that includes the initial state and the new state resulting from the simulation block 306. During the second iteration, the test processor will again select a goal in block 301 that is based on a heuristic decision, such as a coverage value. In block 302, a state will be selected from the list that includes the initial state and the new state. The state selected in the second iteration may be the state that is closest to the selected goal if the method is using a Euclidean distance to select a state. In block 304, variables may be selected that are likely to cause a second new state resulting from the second iteration of the simulation that is near the second selected goal. In block 306, the simulation will be performed using the selected states and the selected variables, and a second new state will be reached.

After the first iteration of the method 300, two states (or points within the state space) will be known to the method 300. After the second iteration of the method 300, three states will be known to the method, and so forth. Thus, after each iteration of the method 300, a new state is added to a tree of states that includes all states resulting from iterations of the simulation and, thus, the tree of states grows or increases with each iteration. This growing tree of states is an embodiment of the rapidly exploring random trees (RRT) algorithm.

The use of RRT disclosed herein is advantageous over traditional RRT systems, as inclusion of the select goal block 301 in the method 300 results in more thorough testing than traditional methods that do not include goal selection. Furthermore, traditional RRT systems do not bias goal selection using a heuristic decision, such as coverage. Thus, use of coverage values when selecting goal states is novel and advantageous over traditional methods as it results in a better distribution of test states over the state space.

Figure 4:
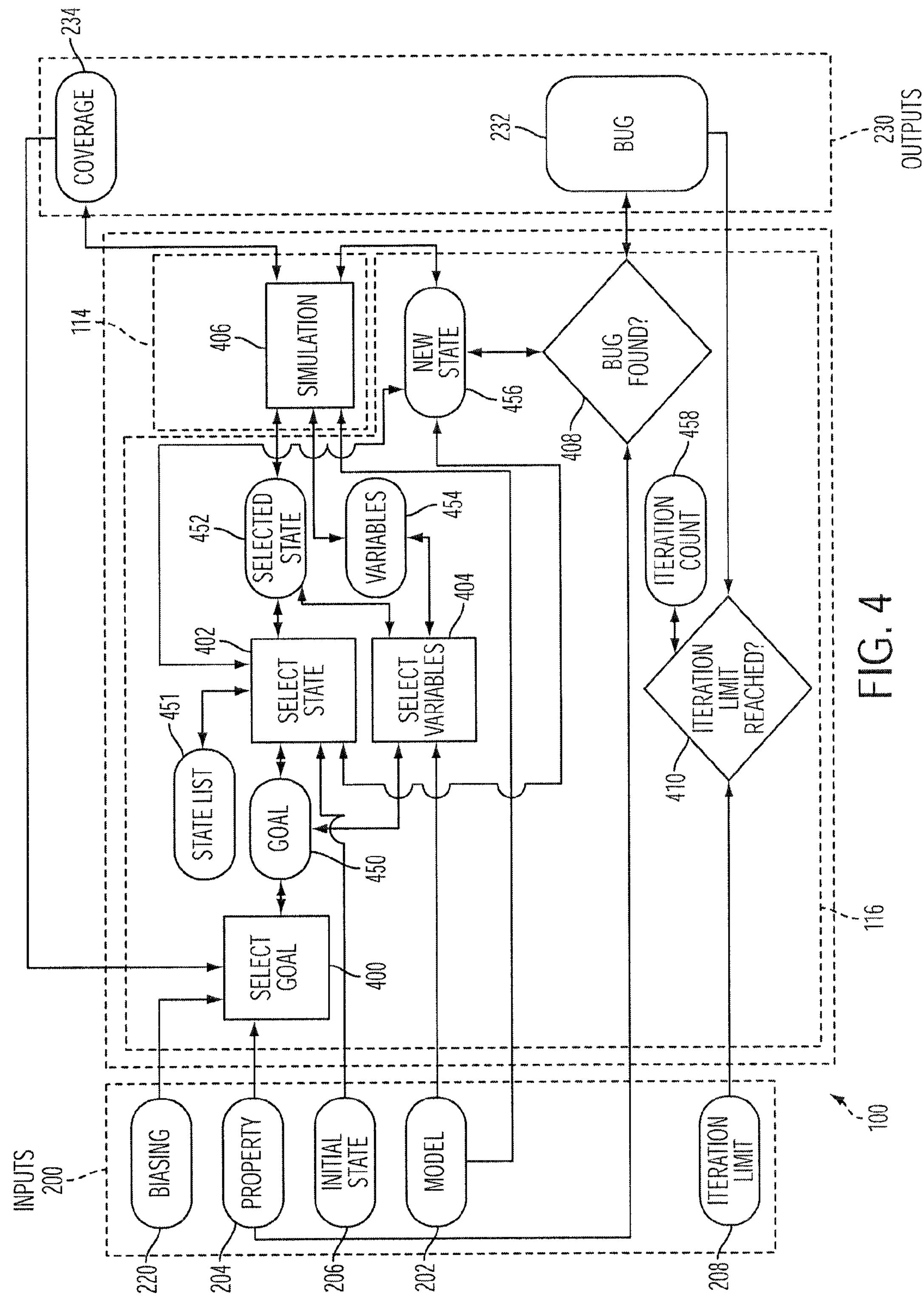
FIG. 4 illustrates a logical diagram, including processing process units, of a test system for determining faulty behavior within a control system according to an embodiment of the present invention.

Turning to FIG. 4, a more detailed logical diagram of the test system 100 is shown. The test system 100 may receive the inputs 200 and generate the outputs 230. The inputs 200 may include biasing 220; the property 204; the initial state 206; the controller or model of the control system and/or the environment of the control system; and the iteration limit 208. The inputs 200 may be provided to the test system 100 via the input device 108.

The test system 100 may include the test code 116 having a select goal process unit 400, a select state process unit 402, a select variables process unit 404, a bug found process unit 408 and an iteration limit reached process unit 410. The test system 100 may also include the modeling program 114 having a simulation process unit 406. In some embodiments, the test code 116 may include the simulation process unit 406 and, in some embodiments, the modeling program 114 may include the process units illustrated within the test code 116. The process units of the test system 100 shown in FIG. 4 are illustrative only and one skilled in the art will realize that a system may function with fewer process units, with additional process units and/or different process units. Furthermore, the functionality of one or more process units can be combined with the functionality of another one or more process unit(s) without departing from the scope of the present disclosure.

As described above, the goal may be selected based on any heuristic decision, such as coverage. When the goal is selected based on two or more heuristic decisions, the inputs 200 can include biasing 220 which places a weight on each of the heuristic decisions. For example, if a first heuristic decision includes coverage and a second heuristic decision includes randomness, the biasing 220 can be set as 20% coverage and 80% randomness, 50% coverage and 50% randomness, or the like.

The provided property 204 can indicate either proper functioning of the control system or improper functioning of the control system. For example, an undesired property can be provided (such as "no engine speed above 5,500 rpm is acceptable") or a desired property can be provided (such as "any engine speed below 5,500 rpm is acceptable"). The property 204 may also include temporal behaviors (i.e., logic defined temporally). For example, a desired property may be stated as "no engine speed above 5,500 rpm is acceptable until at least 5 seconds into acceleration, and after at least 5 seconds into acceleration, no engine speed above 5,900 rpm is acceptable."

The initial state 206 is the initial set of system states of the system model. The initial state 206 can include any condition or value for the system states. In some embodiments, the test system 100 can select an initial state within the allowed test field, thus advantageously eliminating the need for a user to input an initial state. The iteration limit 208 is the number of iterations of testing that will be performed on the control system.

The model 202 is a model of the control system and/or the environment. The model 202 may be provided as a set of machine-readable instructions that mimic the operations of the control system and/or the environment. In some embodiments, a controller to be tested may be connected to the test system 100 instead of using a model of the controller. In these embodiments, the model 202 may still be present as a model of the environment of the controller.

The outputs 230 may include the coverage 234 and the bug data 232. In some embodiments, the outputs 230 may include each goal, each state and each variable. The outputs 230 may be output via the output device 106.

The select goal process unit 400 may receive the property 204 and the biasing 220 as inputs. In some embodiments, the test code 116 may have a pre-selected biasing instead of a user-selected biasing. The select goal process unit 400 may also receive coverage 234 as an input.

When the test processor 102 initiates the test code 116, a goal 450 may be selected at random. The test code 116 may be adapted to perform a method, such as method 300, for multiple iterations. During each iteration of the test code 116 past the initial iteration, the goal 450 may be selected based on the coverage 234 (and the biasing 220, if the goal 450 is to be selected based on a factor in addition to the coverage 234).

The select goal process unit 400 creates a goal 450 as an output. The goal 450 is the desired test state after simulation by the simulation process unit 406.

The select state process unit 402 receives the goal 450 and the initial state 206 as inputs, and may also maintain a state list 451. The state list 451 includes the initial state 206 and other states reached after simulation by the simulation process unit 406. For example, after the simulation is performed, the output includes a new state 456. The new state 456 may be provided to the select state process unit 402 and the new state 456 added to the state list 451. In some embodiments, a separate process unit (e.g., a state list process unit) exists for creating and maintaining the state list 451.

The select state process unit 402 selects a state from the state list 451. The state selection may be random or may be based on another technique, such as a Euclidean distance, in which a state from the state list 451 that is nearest the goal 450 is selected. On the first iteration of the test code 116, the state list 451 will only include the initial state 206; therefore the select state process unit 402 will select the initial state 206. During subsequent iterations of the test code 116, the select state process unit 402 may select another state from the state list 451. For example, the newly selected state may be the state from the state list 451 that is nearest to the goal 450 and the select state process unit 402 generates the selected state 452 as an output.

The select variables process unit 404 may receive the selected state 452, the goal 450 and the model 202 as inputs. The select variables process unit 404 may then select variables randomly or based on at least one of the selected state 452, the goal 450 and/or the model 202. In some embodiments, the select variables process unit 404 may select variables that are likely to cause the new state 456 resulting from the simulation process unit 406 to be closer to the goal 450 than the selected state 452. The select variables process unit 404 then generates the variables 454 as an output.

The simulation process unit 406 may receive the selected state 452, the variables 454 and the model 202 as inputs and may perform a simulation of the model 202 to run based on the selected inputs. The selected state 452 and the variables 454 are used as parameters of the model 202 such that the model 202 is simulated within an environment defined by the selected state 452 and the variables 454. The model 202 initializes to the selected state 452 and the variables 454 are applied to the model. After simulation of the model 202, a new state 456 is created and generated as an output of the simulation process unit 406.

The simulation process unit 406 may also determine the values of the coverage 234. In some embodiments, a separate process unit may exist for determining the values of the coverage 234. The state list 451 may also be an input to the simulation process unit 406. The coverage 234 may be determined by the simulation process unit 406 after each iteration of the simulation by reviewing the state list 451 and comparing the state list 451 to itself and to the property 204. Good coverage is achieved if the state list 451 includes states that are evenly split between test regions.

The bug found process unit 408 may receive the new state 456 and the property 204 as inputs. The bug found process unit 408 compares the new state 456 to the property 204. If the new state 456 is within the desirable property then the bug found process unit 408 will determine that a bug has not been found. If the new state 456 is not within an acceptable property (or is within an unacceptable property) then the bug found process unit 408 will determine that a bug has been found. The bug found process unit 408 may generate and output bug data 232. The bug data 232 may include whether a bug was found or not and, if a bug was found, the bug data may include the variables 454 and/or the new state 456 that caused the bug.

The iteration limit reached process unit 410 may maintain an iteration count 458. After each iteration of the test code 116, the iteration count 458 may increment by one. The iteration limit reached process unit 410 receives the iteration limit 208 and the iteration count 458 as inputs and compares the iteration count 458 to the iteration limit 208. When the iteration count 458 is equal to the iteration limit 208, the iteration limit reached process unit 410 will determine that the iteration limit 208 has been reached and testing may be stopped.

FIGS. 5A-5D illustrate exemplary outputs of a system similar to the test system 100 using a method similar to the method 300. The system was running a modeling program similar to the modeling program 114 (the modeling program was Simulink™) and test code similar to the test code 116. The data illustrated in FIGS. 5A-5D are results from a modeled control system represented by the following set of equations:

$$DX_1/DT=-0.1\times X_1+X_2+U \quad \text{(Eq. 1)}$$

$$DX_2/DT=-10\times X_1-0.1\times X_2+U \quad \text{(Eq. 2)}$$

The given property in the example illustrated in FIGS. 5A-5D is that the control system should never enter the region defined by $\{-10\leq X_1\leq 0,\ 20\leq X_2\leq 30\}$.

Figure 5A:
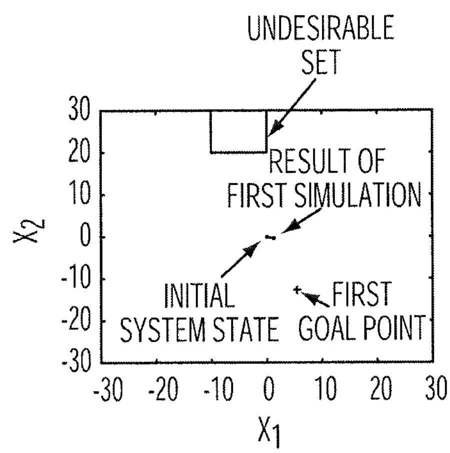
FIG. 5A illustrates an output of a method for determining faulty behavior within a control system after an initial iteration of the method according to an embodiment of the present invention.

Turning to FIG. 5A, the result of the first iteration of the method 300 is shown. The property, or undesirable set, is illustrated in FIGS. 5A-5D. The initial state and the first goal point are also illustrated. The initial system state was {0,0} and the first goal point was {5,−12}. The method selected variables based on what would likely result in a new state that was nearer the goal state than the initial state. The result of the first iteration is illustrated at {1,−0.5}. As illustrated, the new state resulting from the first simulation approaches the first goal point from the initial system state.

Figure 5B:
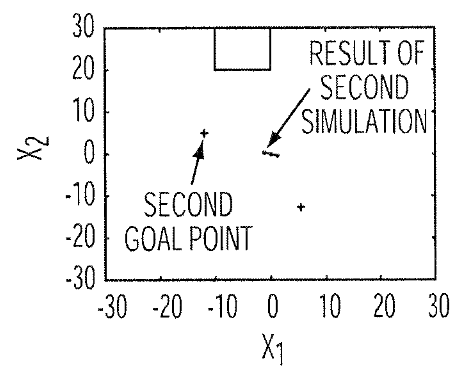
FIG. 5B illustrates an output of the method for determining faulty behavior within a control system after a second iteration of the method according to an embodiment of the present invention.

Turning to FIG. 5B, the result of the method 300 after the second iteration is shown. The second goal point is {−10,5}. The second goal point may have been selected based on coverage or it may have been selected randomly. The system selected the initial system state as the selected state because it was closer to the goal point. The new state resulting from the second iteration of the simulation is {−2,1}, which approaches the second goal point from the state resulting from the first iteration.

Figure 5C:
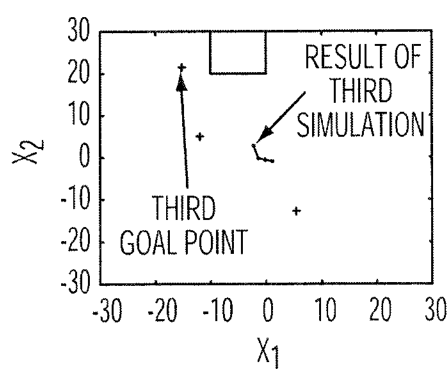
FIG. 5C illustrates an output of the method for determining faulty behavior within a control system after a third iteration of the method according to an embodiment of the present invention.

Turning to FIG. 5C, the result of the system after the third iteration is shown. As illustrated, the third goal point is {−12,21}. The third goal point, like the second goal point, may have been selected based on a coverage value. The resulting state of the third iteration is {−3,2} which approaches the third goal point from the state resulting from the second iteration.

Figure 5D:
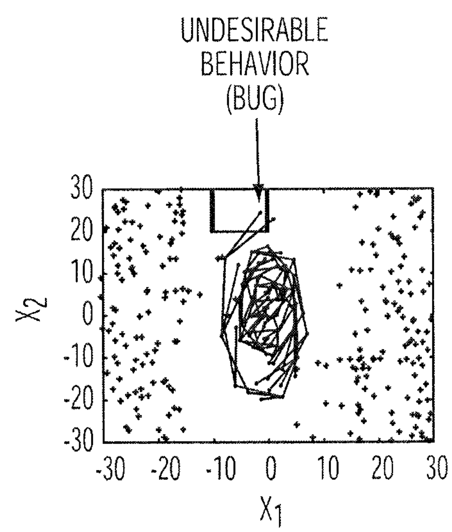
FIG. 5D illustrates an output of the method for determining faulty behavior within a control system after the two hundred and twenty seventh iteration of the method according to an embodiment of the present invention.

Turning to FIG. 5D, the result of the system after 227 iterations is shown. On the 227th iteration, the system stopped running because a bug was found. The bug is indicated by the state that is positioned within the undesired property at {−1,25}. As illustrated, the states have formed a spiral shaped tree within FIG. 5D. This tree is defined by the properties of the control system, the selected goals, the selected states and the selected variables.

The selection of goals was partially randomized; however, the goals were evenly distributed over different regions of the test field. This even distribution illustrates the effect of coverage as a factor for goal selection.

In order to determine coverage data, the test field may be partitioned into regions. These regions can be defined in multiple ways. In some embodiments, each region may be defined as a cell in a grid having a number of dimensions that is equal to the number of variables. The example illustrated in FIGS. 5A-5D can be viewed in this way, with the grid being defined by lines placed at intervals for each of $X_1$ and $X_2$. For example, the grid may be defined by lines positioned at each 10 units of $X_1$ and each 10 units of $X_2$, forming a 6 by 6 grid. However, with a control system having multiple variables, using a grid will result in a very large and unnecessarily detailed division of the test field.

In some embodiments, a KD tree method may be utilized to partition regions in order to more efficiently partition the state space. The KD tree method dynamically defines regions as new states are achieved during testing. Using a KD tree method, a region within a state space may be split into two or more regions in response to the occurrence of predetermined events, such as a certain number of states being achieved within the original region. The new regions may be of equal dimensions or they may be of varied dimensions based on the density of the states within each potential region.

For example, each region may be divided into two new regions after five states in the original region are reached. This ensures that each region will contain less than five states within it. Once a fifth state is positioned within a first region, the first region may be divided into two or more new regions. In some embodiments, each region of the test field will be divided into two new regions when one region of the test field is divided, allowing evenly-sized regions throughout the test field. Using the KD tree method for partitioning the state space prevents unnecessary data usage because unnecessarily-detailed regions can be avoided. Furthermore, use of the KD tree method ensures that enough detail is provided by the state space to accurately represent the coverage of the test field.

By dynamically parsing regions in this manner, a more detailed indication of which regions of the state space have been covered may be provided by the test system 100. With data regarding the defined regions, including the number of states within each region, the system can more easily select goals in certain regions, increasing the amount of coverage. For example, the system may select goals in regions that have no states (i.e., minimal coverage), causing the states resulting from simulations to be more likely to occur within the minimally covered regions.

Figure 6A:
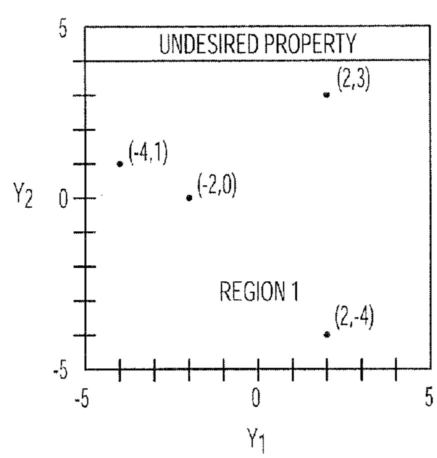
FIG. 6A illustrates a test field after four iterations of a method similar to the method illustrated in FIG. 3 according to an embodiment of the present invention.

With reference to FIG. 6A, a test field is shown after 4 iterations of a method similar to the method 300. In FIG. 6A, the undesired property is $4 \le y_2$. The test field is defined by $\{-5 \le Y_1 \le 5\}$ and $\{-5 \le Y_2 \le 5\}$. The method is configured to split a region once the region receives 5 states. As the test field illustrated in FIG. 6A currently only includes 4 states, only one region is present, Region 1. The position of each state is indicated within parenthesis, such that (−4, 1) indicates a position of $Y_1=-4$, $Y_2=1$.

Figure 6B:
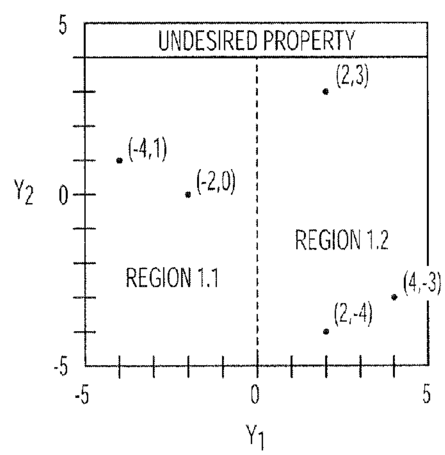
FIG. 6B illustrates the test field shown in FIG. 6A after a fifth iteration of a method similar to the method illustrated in FIG. 3 according to an embodiment of the present invention.

Turning to FIG. 6B, the test field of FIG. 6A is shown after a fifth iteration of the method. In FIG. 6B, a new state is positioned at (4, −3). As a result of Region 1 of FIG. 6A receiving a fifth state, Region 1 was split into two new equal regions: Region 1.1 and Region 1.2. The test processor may split regions in any manner as to result in equally spaced regions and, in some embodiments, the test processor may split regions into unequally spaced regions.

When determining a goal state, the method may use a stochastic procedure based on coverage. The coverage of Region 1.1 can be defined as 2, as 2 states are positioned within Region 1.1. The coverage of Region 1.2 can be defined as 3, as 3 states are positioned within Region 1.2. If the method uses a procedure based solely on coverage to select a goal state, a goal state within Region 1.1 would likely be selected as the coverage is lowest in Region 1.1. A goal state within Region 1.1 would maximize the coverage, as each region would be equally covered.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A computer-implemented method for automatically identifying a faulty behavior of a control system, comprising:

receiving, at a test processor, a description of the faulty behavior;

selecting, using the test processor, a goal state based on a heuristic decision;

selecting, using the test processor, a selected system state;

selecting, using the test processor, a selected variable to the control system based on the goal state;

loading, from a memory, a control model of the control system, the control model including a first model of a controller and a second model of an environment of the controller;

performing, using the test processor, a simulation of the control model using the selected variable and the selected system state as parameters of the simulation; and determining, using the test processor, whether the faulty behavior was observed based on the simulation.

2. The computer-implemented method of claim 1 wherein the goal state is selected based on a stochastic procedure.

3. The computer-implemented method of claim 1 wherein the heuristic decision is based on a coverage value.

4. The computer-implemented method of claim 3 wherein the heuristic decision is based on a combination of the coverage value and another heuristic decision.

5. The computer-implemented method of claim 1 wherein the goal state is selected based on a desire to maximize coverage of a test field.

6. The computer-implemented method of claim 1 wherein the selected system state is selected based on a Euclidean distance.

7. The computer-implemented method of claim 1 wherein the selected variable to the control system is selected using a stochastic procedure.

8. The computer-implemented method of claim 1 wherein the selected variable to the control system is selected further based on the control model.

9. The computer-implemented method of claim 1 wherein performing the simulation results in a new system state.

10. The computer-implemented method of claim 9 further comprising determining, by the test processor, a new measure of coverage based on the new system state.

11. The computer-implemented method of claim 9 wherein determining whether the faulty behavior was observed includes comparing the description of the faulty behavior to the new system state.

12. The computer-implemented method of claim 9 further comprising updating, using the test processor, a state list including an initial state and the new system state.

13. The computer-implemented method of claim 1 further comprising terminating, using the test processor and in response to a determination that the faulty behavior was observed, the computer-implemented method.

14. The computer-implemented method of claim 1 further comprising displaying, via a display and in response to a determination that the faulty behavior was observed, information associated with the faulty behavior.

15. A computer-implemented method for automatically identifying a faulty behavior of a control system within a state space, comprising:

receiving, at a test processor, a description of the faulty behavior;

dividing, using the test processor, the state space into at least two regions;

selecting, using the test processor, a goal state within one of the at least two regions;

selecting, using the test processor, a selected system state based on a Euclidean distance;

selecting, using the test processor, a selected variable to the control system based on the goal state;

loading, from a memory, a control model of the control system;

performing, using the test processor, a simulation of the control model using the selected variable as a parameter of the simulation; and determining, using the test processor, whether the faulty behavior was observed based on the simulation.

16. The computer-implemented method of claim 15 wherein the state space is divided into the at least two regions using a KD tree method.

17. The computer-implemented method of claim 15 wherein the state space is divided into the at least two regions in response to a predetermined number of states existing within the state space.

18. A test system for automatically identifying a faulty behavior of a controller, the test system comprising:

a memory configured to store a model of the controller; and a test processor configured to:

receive a description of the faulty behavior, select a goal state based on a coverage value, select a selected system state, select a variable to the controller based on the goal state, perform a simulation of the controller using the model of the controller and the variable as a parameter of the model of the controller, resulting in a new system state, determine a new measure of coverage based on the new system state, and determine whether the faulty behavior was observed based on the simulation.

19. The test system of claim 18 wherein the test processor is further configured to select the selected system state based on a Euclidean distance.

20. A computer-implemented method for automatically identifying a faulty behavior of a control system, comprising:

receiving, at a test processor, a description of the faulty behavior;

selecting, using the test processor, a goal state based on a heuristic decision;

selecting, using the test processor, a selected system state;

selecting, using the test processor, a selected variable to the control system based on the goal state;

loading, from a memory, a control model of the control system;

performing, using the test processor, a simulation of the control model using the selected variable and the selected system state as parameters of the simulation, resulting in a new system state;

updating, using the test processor, a state list including an initial state and the new system state; and determining, using the test processor, whether the faulty behavior was observed based on the simulation.

21. The computer-implemented method of claim 20 further comprising terminating, using the test processor and in response to a determination that the faulty behavior was observed, the computer-implemented method.

22. The computer-implemented method of claim 20 wherein the goal state is selected based on a desire to maximize coverage of a test field.

* * * * *